(12) United States Patent
Mazur et al.

(10) Patent No.: US 11,874,655 B1
(45) Date of Patent: Jan. 16, 2024

(54) SYSTEMS AND METHODS FOR INDUSTRIAL AUTOMATION COMPONENT REGISTRY

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Jonathan A. Mills, Mayfield Heights, OH (US); Todd A. Wiese, Hubertus, WI (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/945,722

(22) Filed: Sep. 15, 2022

(51) Int. Cl.
*G05B 23/02* (2006.01)
*G05B 19/418* (2006.01)

(52) U.S. Cl.
CPC ... *G05B 23/0283* (2013.01); *G05B 19/41885* (2013.01); *G05B 23/0272* (2013.01)

(58) Field of Classification Search
CPC ............ G06F 11/3452; G06F 18/214; G06F 18/2178; G06F 18/2193; G06Q 50/06; G05B 23/0272; G05B 23/0283; G05B 19/41885

USPC ........................................................ 702/184
See application file for complete search history.

(56) References Cited

U.S. PATENT DOCUMENTS 11,268,349 B2 * 3/2022 Weatherhead .......... E21B 41/00

OTHER PUBLICATIONS

Strohmenger et al., CN 105988451 A, "Analysis Based On Cloud For Industrial Automation", Date Published: Oct. 5, 2016 (Year: 2016).*

* cited by examiner

*Primary Examiner* — John H Le
(74) *Attorney, Agent, or Firm* — Fletcher Yoder, P.C.

(57) ABSTRACT

A cloud computing system receives data associated with a component of an industrial automation system, wherein the data identifies a supplier of the component, and a location of the component within the industrial automation system, updates a registry for the industrial automation system based on the received data, generates a mapping between the industrial automation system and the component of the industrial automation system, wherein the mapping is indicative of the supplier, the location, or both, models the component performing one or more operations in the industrial automation system based on the received data, the registry, and the mapping, determines a recommended action for the industrial automation system based on the model, the received data, the registry, and the mapping, and transmits the recommended action to a computing device.

20 Claims, 5 Drawing Sheets

SYSTEMS AND METHODS FOR INDUSTRIAL AUTOMATION COMPONENT REGISTRY

BACKGROUND

The present disclosure generally relates to storing and maintaining information about components of an industrial automation system.

Industrial automation systems may include components or parts from dozens, hundreds, or even thousands of original equipment manufacturers (OEMs) or suppliers. Accordingly, when an operator of an industrial automation system wants to obtain more information (e.g., warranty information, product manual, etc.) about a component it owns, order a replacement part, request service, and so forth, it may be difficult to determine which OEM or supplier to contact. Additionally, components obtained from different OEMs may be difficult to get to work well together in an industrial automation system to perform an industrial automation process. Further, for complex industrial automation systems, it may be difficult to determine a specific location of a particular component within the industrial automation system.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer-readable medium comprising instructions that, when executed by processing circuitry of a cloud computing system, cause the processing circuitry to receive data associated with a component of an industrial automation system, wherein the data identifies a supplier of the component, and a location of the component within the industrial automation system, update a registry for the industrial automation system based on the received data, generate a mapping between the industrial automation system and the component of the industrial automation system, wherein the mapping is indicative of the supplier, the location, or both, model the component performing one or more operations in the industrial automation system based on the received data, the registry, and the mapping, determine a recommended action for the industrial automation system based on the model, the received data, the registry, and the mapping, and transmit the recommended action to a computing device.

In another embodiment, a method includes updating a registry for the industrial automation system based on the received data, retrieving supplemental data for the component based on the supplier or OEM of the component, and the registry, modeling the component performing one or more operations in the industrial automation system based on the received data, the retrieved supplemental data, and the registry, determining a recommended action for the industrial automation system based on the model, the received data, the retrieved supplemental data, and the registry, and transmitting the recommended action to a computing device.

In a further embodiment, a non-transitory computer-readable medium comprising instructions that, when executed by processing circuitry of a cloud computing system, cause the processing circuitry to receive data associated with a component of an industrial automation system, wherein the data identifies one or more characteristics of the component, update a registry for the industrial automation system based on the received data, model the component performing one or more operations in the industrial automation system based on the received data and the registry, determine a recommended action for the industrial automation system based on the model, the received data, and the registry, and transmit the recommended action to a computing device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards a cloud-based system that collects data from the industrial automation system and maintains a registry or registries (e.g., including one or more subregistries) for the industrial automation system. For example, the registry may include listings of original equipment manufacturers (OEMs) and/or suppliers, vendors, serial numbers, model/part numbers, catalog numbers, vendor/supplier/OEM contact information, etc. for components or parts. This may be used, for example, to quickly and easily determine which OEMs/suppliers to contact to obtain new or replacement components/parts, provide a hyperlink to the OEMs/suppliers, and in some cases provide automatic ordering capabilities. Further, the system may be configured to fetch data pertaining to components and/or parts based on identifying information about components and/or parts and the stored OEM/supplier information. This may include, for example, product manuals, warranty information, recall information, service/maintenance guides, product specifications, product dimensions, replacement specifications, compatibility information, and so forth. The registry may also include location information about specific components/parts. Location information may be in the form of global location according to some coordinate system (e.g., GPS coordinates, quadrant/location within a facility or on a floor), or location relative to other components (spatially, within a process flow, etc.) within the industrial automation system. Once data has been collected, mappings between industrial automation systems, components, parts, and so forth may be generated. These registries may then be used to manage components within the industrial automation system, especially components from different OEMs (e.g., conveyor systems from two different OEMs) that may have limited capabilities to communicate with one another, to coordinate operations and work in harmony.

Figure 1:
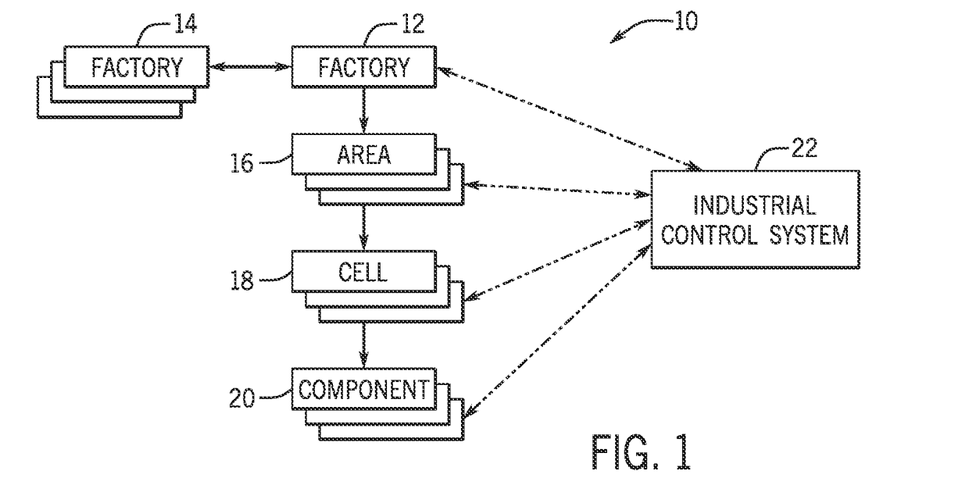
FIG. 1 illustrates a block diagram representing example hierarchical levels of an industrial automation system, in accordance with an embodiment presented herein.

By way of introduction, FIG. 1 depicts a block diagram of an example of hierarchical levels that may represent an industrial automation system 10. The industrial automation system 10 may be any system in the material handling, packaging industries, manufacturing, processing, batch processing, or any technical field that employs the use of one or more industrial automation components. In one embodiment, the industrial automation system 10 may include a factory 12 that may encompass part of the entire industrial automation system 10. As such, the industrial automation system 10 may include additional factories 14 that may be employed with the factory 12 to perform an industrial automation process or the like.

Each factory 12 (or factory 14) may be divided into a number of areas 16, which may, for example, include different production processes that use different types of industrial automation components. In one example, one area 16 may include a sub-assembly production process and another area 16 may include a core production process. In another example, each area 16 may be related to a different operation being performed in the manufacturing process. For instance, in a jelly bean manufacturing system, the areas 16 may include a jelly bean making area, a packaging area, a water filtration area, and the like. In yet another example, the area may include a production line in which a particular industrial process may be performed. Referring back to the jelly bean manufacturing system example, the production line may include a cooking line in which the jelly beans may be created, a sorting line where the jelly beans may be sorted according to a respective flavor, and a packaging line where the sorted jelly beans may be packaged into boxes or the like.

The area 16 may also be associated with physical locations of a number of components 20 with respect to the industrial automation system 10. The areas 16 may also be related to different discipline areas of the industrial automation system 10, such as batch operation areas, continuous operation areas, discrete operation areas, inventory operation areas, and the like.

The areas 16 may be subdivided into smaller units, or cells 18, which may be further subdivided into components 20. Using the example described above, the sub-assembly production process area 16 may be subdivided into cells 18 that may denote a particular group of industrial automation components 20 that may be used to perform one aspect of the sub-assembly production process. As such, the cell 18 may include a portion of the area 16 such as first part of a production line. The cell 18 may also include different parts of a particular procedure.

These cells 18 may then be further subdivided into components 20, which may correspond to individual industrial automation components, such as controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. Although the factory 12, the factories 14, the areas 16, and the cells 18 are termed as factories, areas, and cells, it should be noted that in various industries these groupings may be referred to differently in different industries or the like. For instance, the groupings may be termed as units, areas, sites, and the like.

The components 20 may also be related to various industrial equipment such as mixers, machine conveyors, tanks, skids, specialized original equipment manufacturer machines, and the like. The components 20 may also be associated with devices used by the equipment such as scanners, gauges, valves, flow meters, and the like. In one embodiment, every aspect of the component 20 may be controlled or operated by a single controller (e.g., control system). In another embodiment, the control and operation of each aspect of the component 20 may be distributed via multiple controllers (e.g., control system).

The components 20 may be used within the corresponding cell 18, area 16, or factory 12 to perform various operations for the respective cell 18, area 16, or factory 12. In certain embodiments, the components 20 may be communicatively coupled to each other, to an industrial control system 22, or the like. Additionally, the industrial control system 22 may also be communicatively coupled to one or more control systems that may monitor and/or control the operations of each respective cell 18, area 16, or factory 12.

As such, the industrial control system 22 may be a computing device that may include communication abilities, processing abilities, and the like. For example, the industrial control system 22 may be a controller, such as a programmable logic controller (PLC), a programmable automation controller (PAC), or any other controller that may monitor, control, and operate an industrial automation device or component. The industrial control system 22 may be incorporated into any physical device (e.g., the industrial automation components 20) or may be implemented as a stand-alone computing device (e.g., general purpose computer), such as a desktop computer, a laptop computer, a tablet computer, a mobile device computing device, or the like.

In certain embodiments, the industrial control system 22 may be implemented within devices that enable industrial automation components 20 to connect and communicate with each other. For instance, the industrial control system 22 may be implemented within network routers and/or switches. In this manner, the network routers and/or switches may host the industrial control system 22 that may be used to control and operate the industrial control components 20 that may be communicatively coupled to the respective network router and/or switch. Since network routers and/or switches may serve as a hub for data transfers between the industrial automation components 20, the industrial control system 22 embedded along with the routers and/or switches may be strategically positioned within a data network to have access or receive data associated with various industrial automation components 20. As such, the industrial control system 22 may perform various types of analyses on the received data and may control and operate the respective industrial automation components 20 more efficiently or effectively based on the results of the analyses.

In addition to the physical devices mentioned above, the industrial control system 22 may include a software-based emulation of any of the aforementioned physical devices. For example, the industrial control system 22 may be implemented as software modules that may perform similar operations as certain hardware controllers, devices, and the like. As such, the industrial control system 22 may create virtual instances of the hardware components (e.g., controllers, I/O modules). These virtual instances may provide more flexible ways in which the industrial control system 22 may be implemented to monitor and control the industrial automation components 20.

In one embodiment, the industrial control system 22 may be implemented virtually in a cloud-accessible platform (i.e., cloud-computing system), one or more servers, in various computing devices (e.g., general purpose computers), and the like. As such, the industrial control system 22 may operate as a soft controller or as a control engine running in the cloud-computing system. By virtually implementing the industrial control system 22 in a cloud-computing system, the industrial control system may use a distributed computing architecture to perform various analyses and control operations. As more data associated with the industrial automation components 20, the cells 18, the areas 16, and the factories 14 become available, the distributed computing architecture in the cloud-computing system may enable data analysis to be performed more efficiently. That is, since the cloud-computing system may incorporate numerous computing systems and processors to perform the data analysis, the results of the analysis may be available more quickly. In this way, the respective operations of the industrial automation components 20, the cells 18, the areas 16, and the factories 14 may be controlled in real-time or near real-time.

Keeping the foregoing in mind, it should be understood that the industrial control system 22, as mentioned throughout this disclosure, may be implemented as physical components and/or virtual components (i.e., software-based) used to monitor and/or operate the industrial automation components 20, the cells 18, the areas 16, and the factories 14. Moreover, by providing the ability to incorporate the industrial control system 22 into various types of environments, the industrial automation system 10 may be well suited to expand and grow with the addition of new industrial automation components 20.

Figure 2:
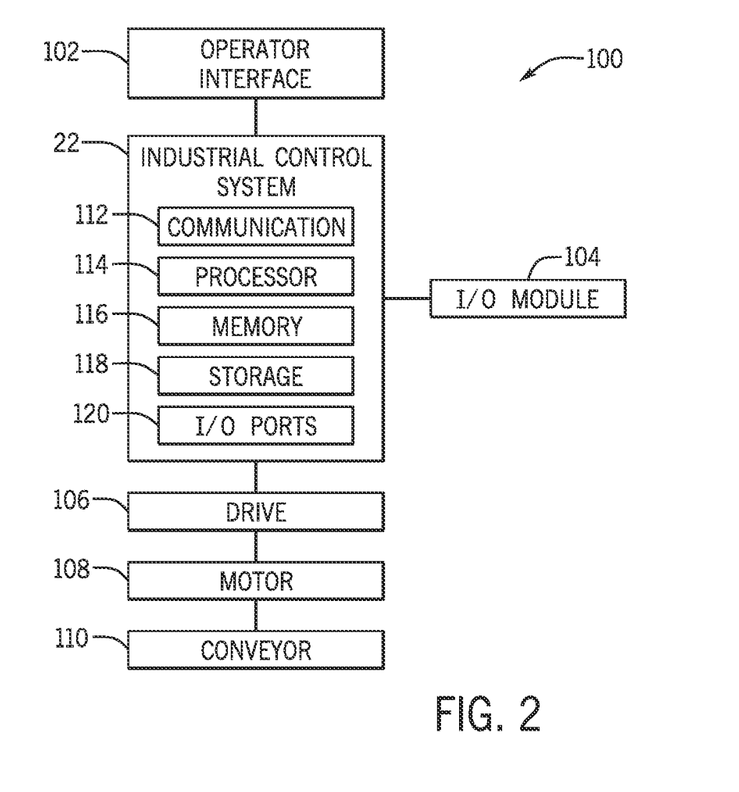
FIG. 2 illustrates a block diagram of an example control system that may be employed within the industrial automation system of FIG. 1, in accordance with an embodiment presented herein.

FIG. 2 illustrates an example control system 100 that may be employed with the industrial control system 22. As shown in FIG. 2, the industrial control system 22 may be communicatively coupled to an operator interface 102, which may be used to modify and/or view the settings and operations of the industrial control system 22. The operator interface 102 may be a user interface that may include a display and an input device used to communicate with the industrial control system 22. The display may be used to display various images generated by industrial control system 22, such as a graphical user interface (GUI) for operating the industrial control system 22. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the industrial control system 22. In some embodiments, the operator interface 102 may be characterized as a human-machine interface, a human-interface machine, or the like.

The industrial control system 22 may also be communicatively coupled to input/output (I/O) modules 104. The I/O modules 104 may enable the industrial control system 22 to communicate with various devices in the industrial automation system. Moreover, the I/O modules 104 may enable the industrial control system 22 to receive information from the various devices, such that the information may provide reference points and other details regarding the industrial automation system to assist the industrial control system 22 to become aware of the environment in which the industrial control system 22 may be operating.

Generally, the industrial control system 22 may also be communicatively coupled to a certain device that may be used to control or manage the operation of the industrial automation system. For instance, in one embodiment, the industrial control system 22 may be coupled to a drive 106. The drive 106 may be an electrical drive that may convert an input alternating current (AC) voltage into a controllable AC voltage using a rectifier circuit and an inverter circuit. The industrial control system 22, in one embodiment, may be a controller that may control the operation of the drive 106. The drive 106 may be coupled to a motor 108, which may operate a component such as a conveyor 110 or the like. In one embodiment, the industrial control system 22 may be communicatively coupled to the operator interface 102, the I/O module 104, the drive 106, or the like via a communication network such as EtherNet/IP, ControlNet, DeviceNet, or any other industrial communication network protocol.

Keeping the example control system 100 in mind and referring to FIG. 1, the drive 106, the motor 108, and the conveyor 110 may each be considered to be a single component 20. However, the drive 106, the motor 108, and the conveyor 110 may also be considered to be a part of a particular cell 18, area 16, and factory 12. Accordingly, the industrial control system 22 may have the ability to adjust the operation of the component 20, the cell 18, the area 16, and the factory 12. For example, by adjusting the operation of the drive 106, the industrial control system 22 may adjust the operation of the motor 108 and the conveyor 110. Consequently, the industrial control system 22 may adjust the operation of the cell 18, the area 16, and the factory 12 having the conveyor 110 as a component. By understanding how each component 20 may be related to the industrial automation system 10 with respect to each area 16, each cell 18, and each component 20, the industrial control system 22 may begin to become capable to manage the operations (e.g., production, energy usage, equipment lifecycle) of the industrial automation system 10 more efficiently.

As mentioned above, the industrial control system 22 may be a controller or any computing device that may include communication abilities, processing abilities, and the like. For instance, as illustrated in FIG. 2, the industrial control system 22 may include a communication component 112, a processor 114, a memory 116, a storage 118, input/output (I/O) ports 120, and the like. The communication component 112 may be a wireless or wired communication component that may facilitate communication between the industrial automation components 20, the control systems for the factory 12, the area 16, the cell 18, and the like. The processor 114 may be any type of computer processor or microprocessor capable of executing computer-executable code. The processor 114 may also include multiple processors that may perform the operations described below. The memory 116 and the storage 118 may be any suitable articles of manufacture that can serve as media to store processor-executable code, data, or the like. These articles of manufacture may represent computer-readable media (i.e., any suitable form of memory or storage) that may store the processor-executable code used by the processor 114 to perform the presently disclosed techniques. The memory 116 and the storage 118 may also be used to store the data, analysis of the data, and the like. The memory 116 and the storage 118 may represent non-transitory computer-readable media (i.e., any suitable form of memory or storage) that may store the processor-executable code used by the processor 114 to perform various techniques described herein. It should be noted that non-transitory merely indicates that the media is tangible and not a signal.

The I/O ports 120 may be interfaces that may couple to the I/O modules 104 discussed above. Moreover, while the industrial control system 22 is illustrated as including the communication component 112, processor 114, memory 116, storage 118, and input/output (I/O) ports 120, it should be noted that the control system for the factory 12, the area 16, the cell 18, and the like may also include the same components to perform the various techniques described herein.

Keeping the foregoing in mind, the industrial control system 22 may use the communication component 112 to communicatively couple to one or more control systems. The industrial control system 22 may also monitor and/or control the operations of each respective component 20, cell 18, area 16, or factory 12. For example, the industrial control system 22 may receive data received from assets, controllers, and the like (e.g., the components 20) that may be located in the factory 12, the areas 16, or the cells 18. In one embodiment, the industrial control system 22 or a control system for each area 16, cell 18, or component 20 may receive information related to how the industrial automation system 10 may be subdivided, how each area 16, cell 18, and component 20 may interact with each other, which components 20 are part of each factory 12, area 16, or cell 18, or the like. For example, each area 16 may be related to a particular process of a manufacturing process. As such, the information received by the respective control system may detail which processes performed in certain areas 16 may depend on other processes being completed in other areas 16.

In certain embodiments, the respective control system may determine how each component 20 may relate to a respective cell 18 or area 16 based on data received from each respective component 20. For instance, a control system of a first component 20 may receive data from multiple other components 20, such as a motor for a conveyer belt and a compressor for some industrial automation device. Upon receiving the data from a second component 20 that corresponds to the motor for the conveyer belt, the control system of the first component 20 may determine that the second component 20 is associated with some cell 18, which may be part of some area 16, based on a speed in which the motor may be operating. That is, the control system of the first component 20 may refer to information, such as system design parameters for the industrial automation system 10, and determine where the motor is located by identifying a motor with operating parameters, as specified by the system design parameters, having a substantially similar speed as the received speed. In certain embodiments, the speed at which the motor may be operating may not be sufficient to identify a particular motor if other motors in the industrial automation system 10 are operating at the same speed. As such, the control system may identify a motor by monitoring a speed profile (i.e., speed curve over time) of each motor in the industrial automation system 10. Additional ways in which a control system may identify particular components 20 may include monitoring an operating mode (e.g., running/stopped/paused) of each component 20, examining network related information (e.g. IP addresses, MAC addresses, sub-net masks, or a combination of any of these, etc.) associated with each component 20, analyzing electronically identified device data (e.g., description catalog number and/or electronic key provided via Ethernet/IP or CIP-base d protocols), monitoring operating temperatures of each component 20 if available (e.g., components 20 in certain cells 18 are exposed to more heat/cold than others cells 18), monitoring energy consumption data associated with each component (e.g., larger drives could be part of and used in certain cells 18 while smaller drives are used in other cells 18), and so forth.

In any case, after analyzing the data associated with each component 20, the control system of the first component 20 may determine its relationship with other components 20 of the industrial automation system with respect to the various scopes or hierarchical levels of the industrial automation system 10. By understanding the relationship to other components 20 with respect to various scopes of the industrial automation system 10, the control system of the first component 20 may become aware of conditions occurring in processes, areas 16, or cells 18 that may directly or indirectly affect the operations of the first component 20. As such, the control system of the first component 20 may adjust its operations and send commands to other components 20 to adjust their respective operations to compensate or minimize negative consequences that may occur due to the conditions in the areas 16, the cells 18, or the like. For example, production capacity of upstream or downstream cells being automatically adjusted by control systems in the respective cells by monitoring production levels of the cells adjacent to or related to the respective control system. As a result, the control systems may optimize production of the industrial automation system 10 by reducing the effects of bottlenecks cells that may lead to over or under production. In another example, sections of a conveyor used to transport materials may start adjusting their respective speeds based on other sections of the conveyor or production variances associated with the area 16, the cells 18, or the entire factory 12. In yet another example, the control system of the first component 20 may take into account energy consumption data associated with a second component to adjust the operation of the first component 20 (e.g. go to a lower energy consumption mode to maintain overall consumption constant, etc.). Additionally, after each component 20 becomes aware of the presence or existence of another component 20, some of the components 20 may negotiate and determine an optimal production rates for each component 20 based on predetermined criteria such as energy consumption/rates, production mix, production levels, and the like.

Figure 3:
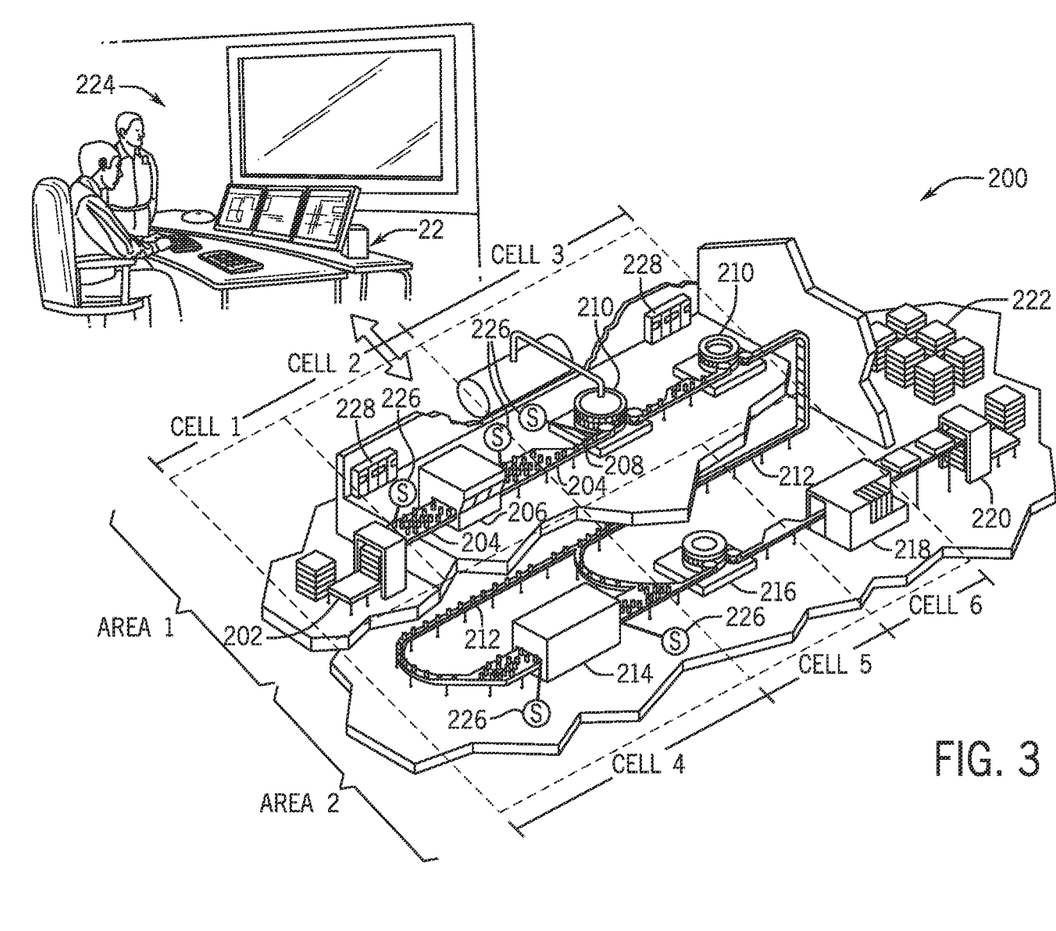
FIG. 3 illustrates an example of the industrial automation system of FIG. 1, in accordance with an embodiment presented herein.

Keeping the foregoing in mind, an example industrial automation system 10 of a packaging factory 200 and how the packaging factory 200 may be divided and sub-divided into areas 16 and cells 18 are depicted in FIG. 3. As illustrated in FIG. 3, the packaging factory 200 may represent an exemplary high-speed packaging line that may be employed in the food and beverage industry that may process beverage containers (i.e., a beverage line). As such, the packaging factory 200 may include industrial automation components that, for example, may enable machine components to fill, label, package, or palletize containers. The packaging factory 200 may also include one or more conveyor sections that may transport, align, or buffer containers between the machine components. Although FIG. 3 illustrates a packaging factory, it should be noted that the embodiments described herein are not limited for use with a packaging factory. Instead, it should be understood that the embodiments described herein may be employed in any industrial automation environment.

As illustrated in FIG. 3, the packaging factory 200 may include machine components configured to conduct a particular function with respect the beverage packaging process. For example, the beverage packaging process begins at a loading station 202, where pallets of empty cans or bottles to be filled are fed into packaging factory 200 via a conveyor section 204. The conveyor section 204 transports the empty cans from the loading station 202 to a washing station 206, where the empty cans and bottles are washed and prepared for filling. As the washed cans and bottles exit the washing station 206, the conveyor section 204 may gradually transition into an aligning conveyor section 208, such that the washed cans and bottles enter a filling and sealing station 210 in a single-file line.

The filling and sealing station 210 may function at an optimal rate when the washed cans and bottles enter the filling and sealing station 210 in a steady, uniform stream. However, if the transition between the conveyor section 204 and the aligning conveyor section 208 is erratic or faster than desired, the filling and sealing station 210 may not function at an optimal rate. As such, optimizing performance parameters (e.g., speed, size, function, position/arrangement, or quantity) of the conveyor sections (i.e., conveyor section 204 or aligning conveyor section 208) may be beneficial to the efficiency of the packaging factory 200.

As the sealed cans exit the filling and sealing station 210, a buffering conveyor section 212 may hold the sealed cans to delay their entry into the next station. In addition, the buffering conveyor section 212 may transport the sealed cans in a single-file line so that the sealed cans arrive at a sterilization station 214 or a labeling station 216 at a desired time with the desired quantity of cans. Similar to the filling and sealing station 210, the packaging station 218 or the labeling station 216 functions efficiently when the buffering conveyor section 212 operates at optimal performance parameters (e.g., optimal speed, size, function, position/arrangement, or quantity). After the cans and bottles have been sterilized and/or labeled, they are packaged into cases (e.g., 6-pack, 24-pack, etc.) at a packaging station 218, before they are palletized for transport at station 220 or stored in a warehouse 222. Clearly, for other applications, the particular system components, the conveyors and their function will be different and specially adapted to the application.

The packaging factory 200 may also include the industrial control system 22, which may be located in a control room 224 or the like. The industrial control system 22 may be coupled to one or more sensors 226, which may monitor various aspects of the machine components or conveyor sections of the packaging factory 200. The sensors 226 may include any type of sensor, such as a pressure sensor, an accelerometer, a heat sensor, a motion sensor, a voltage sensor, and the like. The sensors 226 may be located in various positions within the packaging factory 200 and may measure a parameter value of interest relating to the beverage packaging process during the operation of the packaging factory 200. For example, in certain embodiments, the sensors 226 may include sensors configured to measure the rate of bottles or containers per minute (BPM) entering or leaving a machine component (i.e., stations 204, 206, 208, 214, 216, 218 or 220), or the rate of accumulation of bottles on a portion of a conveyor section (e.g., conveyor section 204 or 212). In general, any sensors 226 capable of measuring a parameter value of interest relating to the beverage packaging process of the packaging factory 200 (e.g., rate, pressure, speed, accumulation, density, distance, position/arrangement, quantity, size, and so forth) may be used.

In some embodiments, the packaging factory 200 may include a number of industrial automation power components 228 that may be used to control power used by various machine components in the packaging factory 200. The power components 228 may include devices, such as drives, motors, inverters, switch gear, and the like, which may be used to operate a corresponding machine component. For example, the conveyor section 204 may rotate using a motor, which may be controlled via a power component 228, such as a variable frequency drive.

The power component 228 may include a control system that may monitor and control the operations of the respective power component 228. As such, the power component 228 may correspond to the component 20 described above with respect to FIG. 1. Referring back to the example above, the control system of the power component 228, such as the drive used to control the motor rotating the conveyor section 204, may monitor a an operating frequency or feedback signal provided to the motor and may determine the speed at which the conveyor section 204 may be moving. In one embodiment, the control system of the power component 228 may send the data related to the speed at which the conveyor section 204 may be moving to the industrial control system 22 or to other control systems that may control other components 20. In this manner, the industrial control system 22 or other control systems may be aware of the operations of the power component 228 and may account for these operations when determining how its respective component should operate.

Keeping the packaging factory 200 of FIG. 3 in mind, the industrial control system 22 may receive data from multiple power components 228 dispersed throughout the packaging factory 200. The industrial control system 22 may then contextualize the received data with respect to different scopes or hierarchical levels as described above with reference to FIG. 1.

Figure 4:
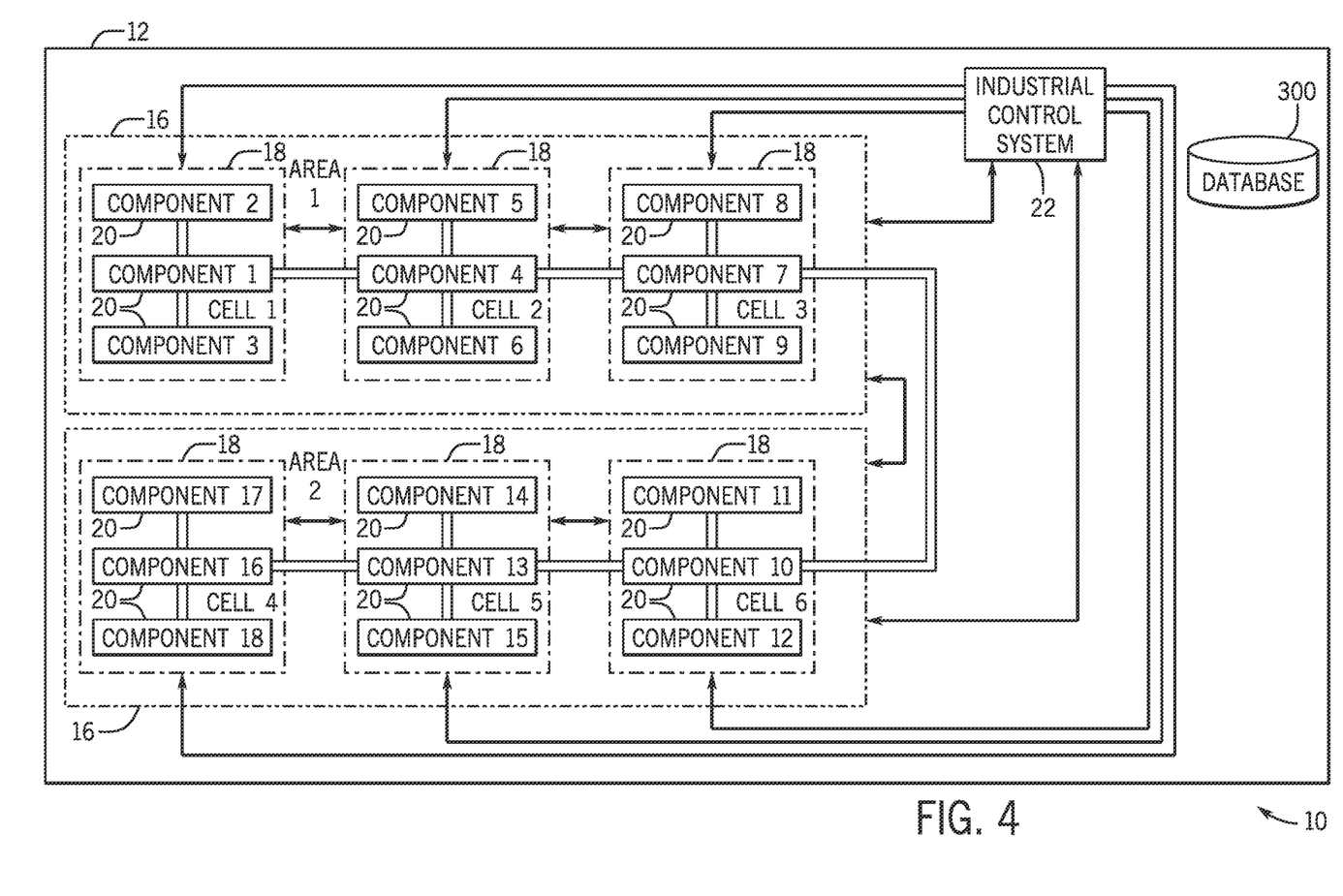
FIG. 4 illustrates a block diagram that depicts hierarchical levels of the example industrial automation system of FIG. 3, in accordance with an embodiment presented herein.

In one embodiment, the scopes of the packaging factory 200 may be categorized based on functions of the components 20 and the cells 18 of the packaging factory 200. For instance, referring to both FIGS. 3 and 4, the loading station 202 may be categorized as cell 1, the washing station 206 may be categorized as cell 2, the sealing station 210 may be categorized as cell 3, the sterilization station 214 may be categorized as cell 4, the labeling station may be categorized as cell 5 and the packaging station 218 may be categorized as cell 6. As shown in FIG. 4, each component 20 may correspond to a particular cell 18. That is, each component 20 that may be used by the respective station may be categorized as part of the respective cell 18.

In the same manner, the areas 16 may be categorized based on functions of the cells 18 of the packaging factory 200. For instance, cells 1-3 of the packaging factory 200 may correspond to a preparation process and cells 4-6 of the packaging factory 200 may correspond to a packaging process. As such, cells 1-3 may be categorized as area 1 and cells 4-6 may be categorized as area 2.

In one embodiment, the industrial control system 22 may determine the categories or scopes of the industrial automation system 10 based on a factory diagram or specification that describes the various processes employed by the industrial automation system 10 and the components 20 used for the respective processes. In another embodiment, each control system for each component 20 may include information indicating the function of the component 20, a location of the component 20 with respect to the industrial automation system 10, a part of a manufacturing process that the component 20 is associated with, or the like. Here, each respective control system of each respective component 20 may send this information to the industrial control system 22 or to other control systems of nearby components 20. The control system that receives the information may then determine how the component 20 that transmitted the information may relate to the various scopes of the industrial automation system 10, how the component 20 that received the information may be related to the component 20 that transmitted the information with respect to the various scopes of the industrial automation system 10, and the like. In certain embodiments, each control system may send information related to the scopes of the industrial automation system 10, information detailing a relationship between each scope of the industrial automation system 10, information detailing a relationship between each component 20 in the industrial automation system with respect to each scope of the industrial automation system 10, and the like to a database 300, which may be accessible by each control system as a centralized database or a database distributed between a number of machines, computers, or the like.

Figure 5:
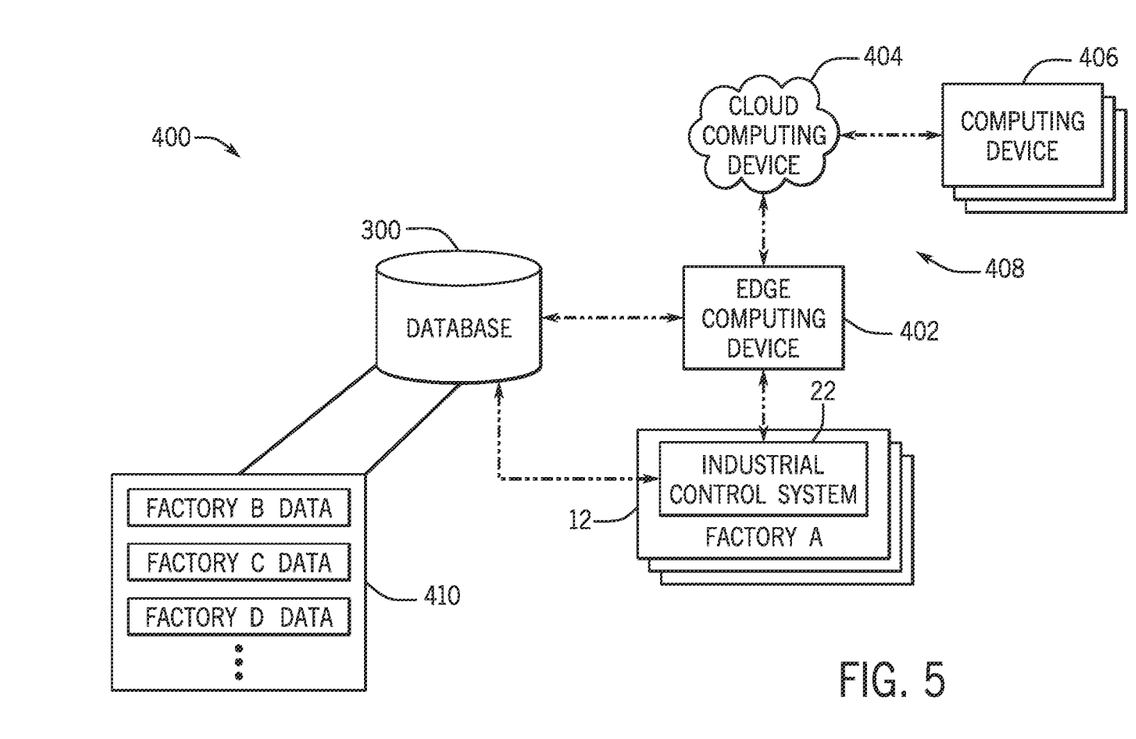
FIG. 5 illustrates a block diagram of a data analysis system, in accordance with an embodiment presented herein.

Additionally, the industrial control system 22 may communicate with other computing devices, such as computing devices not included in the factory 12 that may be controlled by other entities. For example, FIG. 5 depicts a data analysis system 400 that includes the factory 12 (which includes the industrial control system 22), the database 300, an edge computing device 402, a cloud computing device 404, and one or more other computing devices 406. The industrial control system 22 and database 300 may communicate with one another as discussed above. Moreover, the industrial control system 22 and database 300 may be communicatively coupled to the edge computing device 402, which may be a computing device such as a computer, server, router, routing switch, or integrated access device (IAD) that manages the flow of data into and out of a network, such as industrial automation network included in the factory 12 (e.g., a network utilized by the industrial control system 22 to communicate with the components of the industrial automation system 10 and the database 300). Accordingly, the edge computing device 402 may be included within the industrial automation system 10. Furthermore, while FIG. 5 includes a single edge computing device 402, in other embodiments, the data analysis system 400 may include more than one edge computing device 402.

The computing devices 406 may include computers, servers, or the like that are operated or managed by other entities. For example, the computing devices may be associated with other factories or an entity that provides one or more services for the factory 12 (or industrial automation system 10), such as data management, data analysis, security services, or diagnostic services (e.g., to determine or resolve potential errors associated with the industrial automation system 10 or the operation thereof). The computing devices 406 may communicate with the industrial automation system 10 (e.g., via the industrial control system 22) and database 300 via the cloud computing device 404 and the edge computing device 402 utilizing a common data pipeline that may be partially implemented via communication link 408. The communication link 408 may include communication infrastructure, such as a wired connection, wireless connection, or both that communicatively couples the edge computing device 402, the cloud computing device 404, and the computing devices 406 to one another. The common data pipeline generally refers to a communication infrastructure (e.g., the communication link 408) as well as one or more processes utilized to send, receive, and characterize data that is communicated using the communication infrastructure. As such, the techniques described herein may be implemented using already existing communication infrastructure (e.g., wired networks, wireless networks, or a combination thereof), thereby avoiding adding more communication infrastructure in potentially already crowded industrial environments.

The edge computing device 402, the cloud computing device 404, and the computing devices 406 may each include one or more processors that execute computer-readable instructions, such as instructions that may be stored in memory or a storage device that the edge computing device 402, the cloud computing device, and the computing devices 406 may also include. By executing such instructions, the one or more processors included in the edge computing device 402, the cloud computing device, and the computing devices 406 may communicate with one another via the common data pipeline. In other words, the edge computing device 402, the cloud computing device 404, and the computing devices 406 may include the communication component 112, processor 114, memory 116, storage 118, and input/output (I/O) ports 120 described above and utilize these components to enable communication via the common data pipeline. It should be noted that, in other embodiments, the data analysis system 400 may not include the cloud computing device 404. In such embodiments, the computing devices 406 may communicate with the industrial control system 22 and database 300 via just the edge computing device 402. Furthermore, in some embodiments, the cloud computing device 404 may be implemented in the form of a system that includes more than one computing device.

The industrial control system 22 and the database 300 may share various types of data with the computing devices 406 using the common data pipeline. Likewise, the computing devices 406 may communicate with the industrial control system 22 and the database 300 via the common data pipeline. For example, the industrial control system 22 and database 300 may share data regarding the factory 12 (and data 410 regarding factories 14 in the case of the database 300) or components thereof with the edge computing device 402, which may selectively communicate the data to the cloud computing device 404. For instance, as described in more detail below, the edge computing device 402 may group data received from the industrial automation system 10 (e.g., via industrial control system 22 or the database 300), apply metadata (e.g., data tags) to the received data, or both as part of a protocol before sending the data to the cloud computing device 404. By doing so, data associated with the factory 12 (or factories 14) may be characterized in a way that enables the cloud computing device 404 to determine which of the computing devices 406 to which to send the data. Moreover, characterizing the data enables the computing devices 406 and the cloud computing device 404 to interpret the data. For instance, as described above, the data associated with the factory 12 may pertain to a plethora of different devices that are made by different manufacturers and communicate using different protocols, such as FactoryTalk Live Data, EtherNet/IP, or other Common Industrial Protocol (CIP) based protocols, OPC Direct Access (e.g., machine to machine communication protocol for industrial automation developed by the OPC Foundation), or any suitable communication protocol (e.g. DNP3, Modbus, Profibus, LonWorks, DALI, BACnet, KNX, EnOcean). By characterizing the data, the computing devices 406 and the cloud computing device 404 can identify each particular portion of the data. This may enable the computing devices 406 and cloud computing device 404 to determine a layout of the factory 12, the automation devices included in the factory 12 (or factories 14), and what the various forms of received data are (e.g., power consumption data, log files, or other data associated with the factory 12 (or factories 14).

Figure 6:
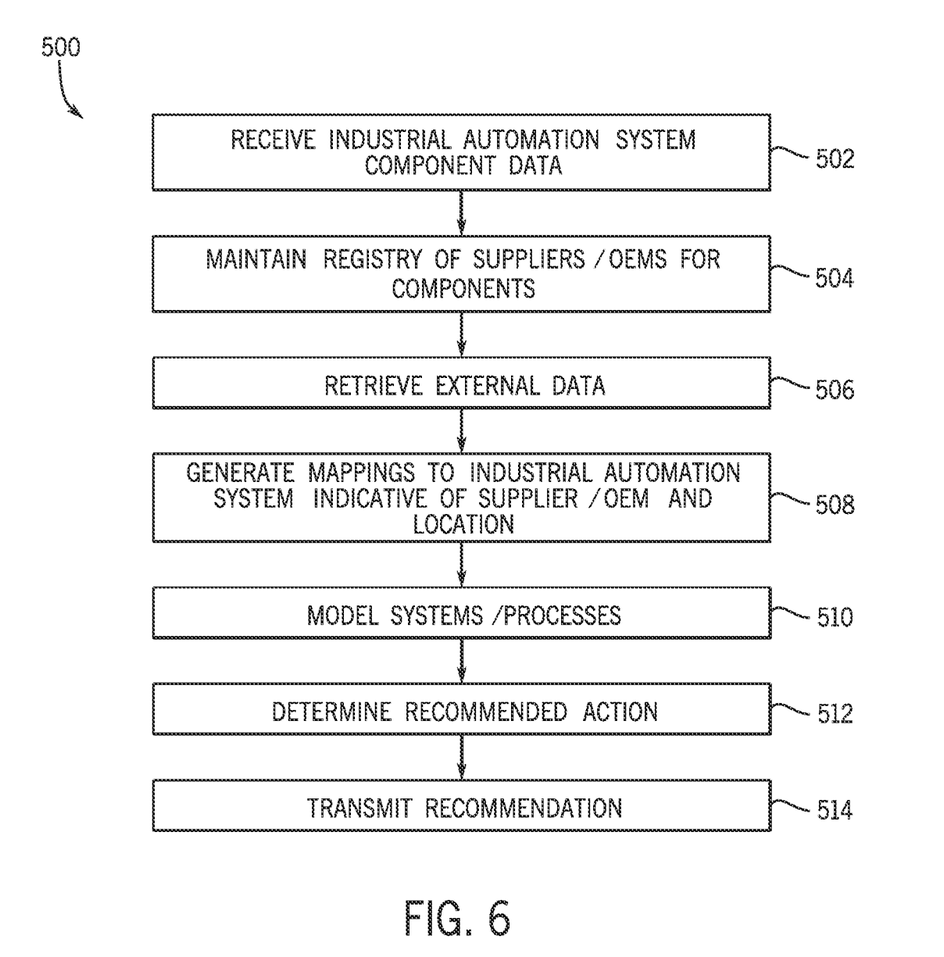
FIG. 6 is a flow chart of a process for maintaining a sub-registry of industrial automation system component and/or component part information, in accordance with embodiments presented herein.

Returning to FIG. 4, an industrial automation system 10 or factory 12 may include components 20 or parts of components from dozens, hundreds, or even thousands of suppliers and/or original equipment manufacturers (OEMs). Further, in more complex industrial automation systems 10 having a large number of components 20, it may be difficult to determine the specific location of particular component 20 or part of a component 20, either in global terms (e.g., GPS coordinates), or relative to other components 20 within the system 10 (e.g., in space, in the process flow, along the flow of product through the system, within an area, cell, and/or component, etc.). Accordingly, a cloud computing device may be used to maintain a sub-registry of component 20 and/or component 20 part information. The sub-registry may be a part of the database 300 or separate from the database 300. With the foregoing in mind, FIG. 6 is a flowchart of a process 500 for maintaining a sub-registry of component 20 and/or component 20 part information and using the sub-registry to improve operations of the industrial automation system 10.

At block 502, industrial automation system component data is received. The data may include, for example, design elements, a design file, a project file, information about characteristics of the various components, or parts of components, of the industrial automation system, such as part number, serial number, model number, OEM, supplier, vendor, catalog number, vendor/supplier/OEM contact information, etc., information about how the various components of the industrial automation system are configured, information about how the various components of the industrial automation system work in concert to perform one or more industrial automation processes, operational data, desired results of the one or more industrial automation processes, acceptable values or ranges for various parameters of the industrial automation system or the one or more industrial automation processes, compatibility information, and so forth. At block 504, the sub-registry is maintained based on the received data. For example, the received data may be processed, compared to the data already stored in the sub-registry, determinations made about how the sub-registry should be updated, and updates made to the sub-registry to reflect the received data. In some embodiments, updates may be provided to a user for approval.

At block 506, external data may be retrieved based on data stored in the sub-registry. For example, data stored in the sub-registry identifying a particular component or part may be used to retrieve other data about the component or part, such as specifications, product manuals, dimensions, compatibility information, maintenance information, warranty information, recall information, public safety information, etc. The external data may be retrieved directly from OEMs/suppliers, from third parties (e.g., industry organizations, standard setting organizations, consumer protection organizations, review/rating organizations, etc.), public databases, governmental sources, crowdsourcing sources, customer review/feedback sources, and so forth. In some embodiments, the retrieved external data (e.g., product manuals) may be stored in the sub-registry, or the sub-registry may be updated with the retrieved external data (e.g., compatibility information, maintenance scheduled, etc.).

At block 508, mappings are generated for the industrial automation system that indicate the component/part information (e.g., OEM, supplier, part/model number, etc.) and location (global location, relative location, location along process flow, area and/or cell within a factory, etc.). The mappings may indicate relationships between the same or similar parts/components, parts/components that interact with one another, parts/components that are near each other (e.g., disposed within a given distance of one another), parts/components that pass product to one another or are otherwise adjacent to one another in the process flow, parts/components that are from common OEMs/suppliers, parts/components that are on similar maintenance schedules, and so forth. At block 510, performance of one or more industrial automation processes as performed by the industrial automation system is modeled (e.g., a model is generated and/or updated) and/or simulated using a model.

At block 512, machine learning may be utilized to analyze the model and generate one or more recommendations. Recommendations may include, for example, adjusting operational parameters, performing service/maintenance, replacing a part, automatically or manually ordering a replacement part, automatically or manually scheduling maintenance/service, using different product/material, providing hyperlinks to useful resources (e.g., written or video instructions to how to perform a service operation, a recalibration, troubleshoot, etc.), and so forth. In some embodiments, the recommendation may include an adjustment to operating parameters (e.g., to increase the lifespan of the part, component, and/or device), or a recommendation for specific replacement parts to increase the lifespan of the part, component, and/or device (e.g., replace with a higher durometer part at next service). As discussed above with respect to FIG. 2, the recommendation may include adjusting operating parameters to optimize the way in which two components interact with one another. For example, in the packaging factory shown and described with regard to FIG. 3, conveyor sections may transport cans and bottles between stations. A first conveyor section from one or more first OEMs may deliver bottles to a first station made up of components from one or more second OEMs, which may, receive the bottles, perform some first operations (e.g., filling and sealing) on the bottles, and provide the bottles to a second conveyor section from one or more third OEMs. The second conveyor section may then provide the bottles to a second station made up of components from one or more fourth OEMs, which may, receive the bottles, perform some second operations (e.g., sterilizing) on the bottles, and provide the bottles to a third conveyor section from one or more fifth OEMs. Because the system utilizes components from many different suppliers/OEMs, getting the various components to operate in concert with one another to perform the industrial automation process may be challenging. Accordingly, the system may use machine learning to generate recommendations to adjust various operational parameters (e.g., motor speeds, flow rates, and so forth) based on the models, the retrieved external data, and information stored in the registry, to optimize operation of the various components.

Industrial automation systems may include components and/or parts from different OEMs. Further, in more complex industrial automation systems having a large number of components, it may be difficult to determine the specific location of particular component, either in global terms, or relative to other components within the system. In some cases, other asset management information about a specific component, such as vendor, serial number, model/part number, catalog number, vendor/supplier/OEM contact information, etc. may be difficult to determine. Accordingly, the present patent application is directed to a cloud-based system that collects data from the industrial automation system and maintains a registry or registries (e.g., including multiple subregistries) for the industrial automation system. For example, the registry may include listings of OEMs and/or suppliers, vendors, serial numbers, model/part numbers, catalog numbers, vendor/supplier/OEM contact information, etc. for components or parts. This may be used, for example, to quickly and easily determine which OEMs/suppliers to contact to obtain new or replacement components/parts, provide a hyperlink to the OEMs/suppliers, and in some cases provide automatic ordering capabilities. Further, the system may be configured to fetch data pertaining to components and/or parts based on identifying information about components and/or parts and the stored OEM/supplier information. This may include, for example, product manuals, warranty information, recall information, service/maintenance guides, product specifications, product dimensions, replacement specifications, compatibility information, and so forth. The registry may also include location information about specific components/parts. Location information may be in the form of global location according to some coordinate system (e.g., GPS coordinates, quadrant/location within a facility or on a floor), or location relative to other components (spatially, within a process flow, etc.) within the industrial automation system. Once data has been collected, mappings between industrial automation systems, components, parts, and so forth may be generated. These registries may then be used to manage components within the industrial automation system, especially components from different OEMs (e.g., conveyor systems from two different OEMs) that may have limited capabilities to communicate with one another, to coordinate operations and work in harmony.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising instructions that, when executed by processing circuitry of a cloud computing system, cause the processing circuitry to perform operations comprising:
   receiving data associated with a component of an industrial automation system, wherein the data identifies a supplier of the component, and a location of the component within the industrial automation system;
   updating a registry for the industrial automation system based on the received data;
   generating a mapping between the industrial automation system and the component of the industrial automation system, wherein the mapping is indicative of the supplier, the location, or both;
   receiving an indication that the component is experiencing a condition;
   modeling the component performing one or more operations in the industrial automation system based on the received data, the registry, and the mapping;
   retrieving, from the registry, a record associated with the component, wherein the record identifies the supplier of the component, the location of the component within the industrial automation system, and comprises a link to a product manual for the component;
   determining a recommended action for the industrial automation system based on the model, the received data, the registry, and the mapping; and
   transmitting the record identifying the supplier of the component, the location of the component within the industrial automation system, the link to the product manual for the component, and the recommended action to a computing device.

2. The non-transitory computer-readable medium of claim 1, wherein the recommended action comprises adjusting one or more operational parameters, performing a service operation, performing a maintenance operation, replacing a part, automatically or manually ordering a replacement part, automatically or manually scheduling maintenance or service, or any combination thereof.

3. The non-transitory computer-readable medium of claim 1, wherein transmitting the recommended action comprises providing instructions for performing a service operation, performing a recalibration, troubleshooting, or any combination thereof.

4. The non-transitory computer-readable medium of claim 1, wherein the operations comprise automatically implementing the recommended action.

5. The non-transitory computer-readable medium of claim 1, wherein the operations comprise:
receiving approval to perform the recommended action; and
performing the recommended action.

6. The non-transitory computer-readable medium of claim 1, wherein the received data is associated with a part of the component.

7. The non-transitory computer-readable medium of claim 1, wherein mappings identify one or more sets of similar components, one or more sets of components that interact with one another, one or more sets of components that are within a threshold distance of one another, one or more sets of components that are adjacent to one another in a process flow of the industrial automation system, one or more sets of components that are from common original equipment manufacturers (OEMs) or suppliers, one or more sets of components that are on a common maintenance schedule, or any combination thereof.

8. The non-transitory computer-readable medium of claim 1, wherein the location of the component comprises a set of global position system (GPS) coordinates.

9. The non-transitory computer-readable medium of claim 1, wherein the location of the component is relative to one or more other components within the industrial automation system.

10. The non-transitory computer-readable medium of claim 1, wherein the location of the component comprises a position along a process flow of the industrial automation system.

11. A method, comprising:
receiving data associated with a component of an industrial automation system, wherein the data identifies a supplier or an original equipment manufacturer (OEM) of the component;
updating a registry for the industrial automation system based on the received data;
retrieving supplemental data for the component based on the supplier or OEM of the component, and the registry;
receiving an indication that the component is experiencing a condition;
modeling the component performing one or more operations in the industrial automation system based on the received data, the retrieved supplemental data, and the registry;
retrieving, from the registry, a record associated with the component, wherein the record identifies the supplier or the OEM of the component, a location of the component within the industrial automation system, and comprises a link to a product manual for the component;
determining a recommended action for the industrial automation system based on the model, the received data, the retrieved supplemental data, and the registry; and
transmitting the record identifying the supplier of the component, the location of the component within the industrial automation system, the link to the product manual for the component, and the recommended action to a computing device.

12. The method of claim 11, wherein the supplemental data is retrieved from the OEM or the supplier.

13. The method of claim 11, wherein the supplemental data is retrieved from a third party.

14. The method of claim 11, wherein the supplemental data comprises one or more specifications, the product manual, one or more component dimensions, component compatibility information, component maintenance information, component warranty information, component recall information, or any combination thereof.

15. The method of claim 11, wherein the recommended action is generated by a machine learning algorithm.

16. A non-transitory computer-readable medium comprising instructions that, when executed by processing circuitry of a cloud computing system, cause the processing circuitry to perform operations comprising:
receiving data associated with a component of an industrial automation system, wherein the data identifies one or more characteristics of the component;
updating a registry for the industrial automation system based on the received data;
receiving an indication that the component is experiencing a condition;
modeling the component performing one or more operations in the industrial automation system based on the received data and the registry;
retrieving, from the registry, a record associated with the component, wherein the record identifies a supplier of the component, a location of the component within the industrial automation system, and comprises a link to a product manual for the component;
determining a recommended action for the industrial automation system based on the model, the received data, and the registry; and
transmitting the record identifying the supplier of the component, the location of the component within the industrial automation system, the link to the product manual for the component and the recommended action to a computing device.

17. The non-transitory computer-readable medium of claim 16, wherein the retrieved record further comprises a part number, a serial number, a model number, an identity of an original equipment manufacturer (OEM), an identity of a vendor, a catalog number, or any combination thereof.

18. The non-transitory computer-readable medium of claim 16, wherein the recommended action comprises adjusting one or more operational parameters, performing a service operation, performing a maintenance operation, replacing a part, automatically or manually ordering a replacement part, automatically or manually scheduling maintenance or service, or any combination thereof.

19. The non-transitory computer-readable medium of claim 16, wherein the received data comprises a position of the component along a process flow of the industrial automation system.

20. The non-transitory computer-readable medium of claim 16, wherein the received data comprises a set of global position system (GPS) coordinates of the component.

* * * * *